Figure 1:
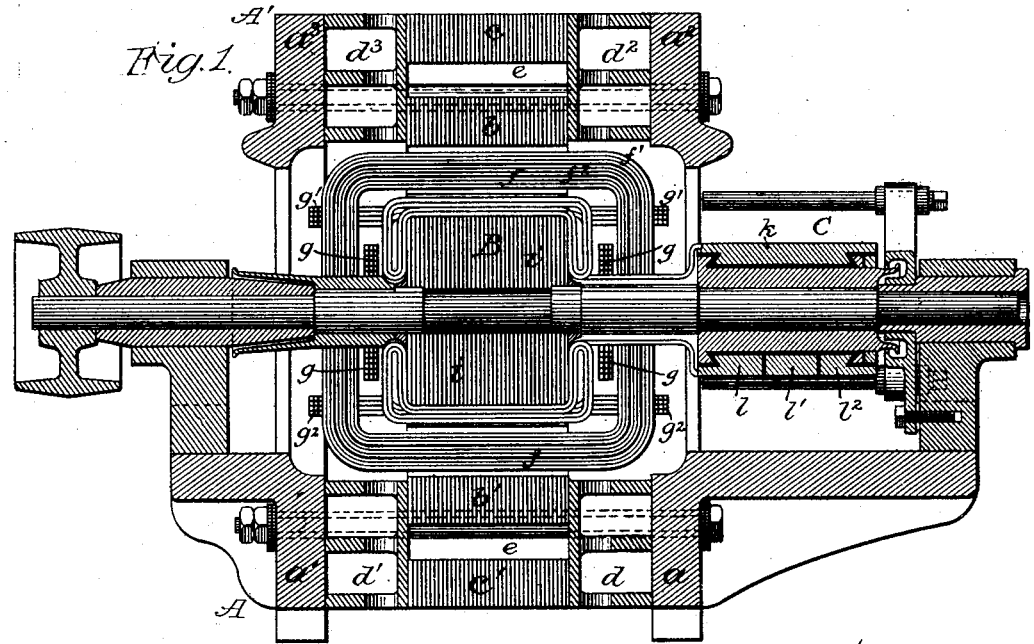

No. 664,733. Patented Dec. 25, 1900.
R. EICKEMEYER, Dec'd.
R. EICKEMEYER, Jr. & C. & M. T. EICKEMEYER, Executors.
METHOD OF CONVERTING THE ENERGY OF ALTERNATING ELECTRIC CURRENTS INTO EFFECTIVE MECHANICAL ENERGY.
(Application filed Nov. 21, 1892.)

(No Model.) 3 Sheets—Sheet 1.

No. 664,733. Patented Dec. 25, 1900.
R. EICKEMEYER, Dec'd.
R. EICKEMEYER, Jr. & C. & M. T. EICKEMEYER, Executors.
METHOD OF CONVERTING THE ENERGY OF ALTERNATING ELECTRIC CURRENTS INTO EFFECTIVE MECHANICAL ENERGY.

(Application filed Nov. 21, 1892.)

(No Model.) 3 Sheets—Sheet 2.

Attest:
Philip F. Larner
Nowell Battle

Inventor:
Rudolf Eickemeyer
By ........ Attorney

No. 664,733. Patented Dec. 25, 1900.
R. EICKEMEYER, Dec'd.
R. EICKEMEYER, Jr. & C. & M. T. EICKEMEYER, Executors.
METHOD OF CONVERTING THE ENERGY OF ALTERNATING ELECTRIC CURRENTS INTO EFFECTIVE MECHANICAL ENERGY.

(Application filed Nov. 21, 1892.)

(No Model.) 3 Sheets—Sheet 3.

United States Patent Office.

RUDOLF EICKEMEYER, OF YONKERS, NEW YORK; RUDOLF EICKEMEYER, JR., CARL EICKEMEYER, AND MARY T. EICKEMEYER EXECUTORS OF SAID RUDOLF EICKEMEYER, DECEASED.

METHOD OF CONVERTING THE ENERGY OF ALTERNATING ELECTRIC CURRENTS INTO EFFECTIVE MECHANICAL ENERGY.

SPECIFICATION forming part of Letters Patent No. 664,733, dated December 25, 1900.

Application filed November 21, 1892. Serial No. 452,607. (No model.)

*To all whom it may concern:*

Be it known that I, RUDOLF EICKEMEYER, of Yonkers, in the county of Westchester and State of New York, have invented a certain new and useful Method of Converting the Energy or Electromotive Force of Alternating Electric Currents into Effective Mechanical Energy; and I do hereby declare that the following specification, taken in connection with the drawings furnished and forming a part of the same, is a clear, true, and complete description of my invention.

In my application for Letters Patent filed December 31, 1890, Serial No. 376,361, I disclosed certain improvements in alternating-current machines as variously devised by me, and said application contained due reservation in and to the disclosed method invented by me for securing effective mechanical energy from alternating electric currents, said method consisting, mainly, in the elimination of counter electromotive force of self-induction by establishing bifilar or inductionless circuits wherever armature self-induction would have been developed had not said inductionless circuits been established, and, further, my method consists in reducing self-induction by the introduction of air-space resistance into appropriate portions of armature magnetic circuits, and, still further, reducing self-induction by working a strong armature—*i. e.*, one having numerous ampere-turns—in a comparatively weak magnetic field, and various other improvements to be hereinafter described and claimed.

It is well known that ordinary series motors containing laminated field-iron may be put into motion by the use of an alternating electric current; but such machines cannot practically or effectively afford mechanical energy because of the development of counter electromotive force of self-induction to such a high degree as to demand excessive voltage for forcing the current through the windings of the armature and field, thereby endangering the machines, and aside from that they are of no practical value because only a very low proportion of the electromotive force of the supplied current can with such machines be converted into mechanical energy, and this is so true of all prior alternating-current machines of which I am cognizant as to render them of little practical or commercial value. I have discovered and demonstrated that field self-induction is materially decreased by working a weak field with a comparatively strong armature. When working a strong armature in a weak field, the counter electromotive force which should be eliminated is due to self-induction of the armature, and I have also discovered and demonstrated that armature self-induction can be practically eliminated by forming bifilar or inductionless circuits at appropriate portions of the armature-circuits, and thereby defeating the development of such armature magnetic circuits as would otherwise generate or cause self-induction. I have also discovered and demonstrated that the introduction of air-space magnetic resistance into appropriate portions of armature magnetic circuits will materially reduce armature self-induction, and especially when employed supplementary to the aforesaid forming of bifilar circuits.

In the conversion of the energy of alternating electric currents into mechanical energy by the use of machines as heretofore organized, the armature-circuits are exposed to great dangers, as from burning, &c., resulting from the short-circuiting of coils, wherein an electromotive force is induced during their commutation. I have discovered that said dangers are wholly obviated by introducing into the commutated circuits an electromotive force of appropriate strength and opposite direction to and balancing the electromotive force acting therein, or as a partial or imperfect equivalent thereof introducing resistance, so as to reduce the current produced by the electromotive force of the commutated coils to a safe limit, or by employing both said resistance and the said opposing electromotive force, and these methods of obviating short-circuiting of commutated portions of armature-circuits constitute other features of my invention.

For the purpose of explaining the application of my method of converting the energy of alternating electric currents into effective mechanical energy I will describe the same in connection with the drawings, which illustrate one of the machines disclosed in my aforesaid application.

Figure 2:
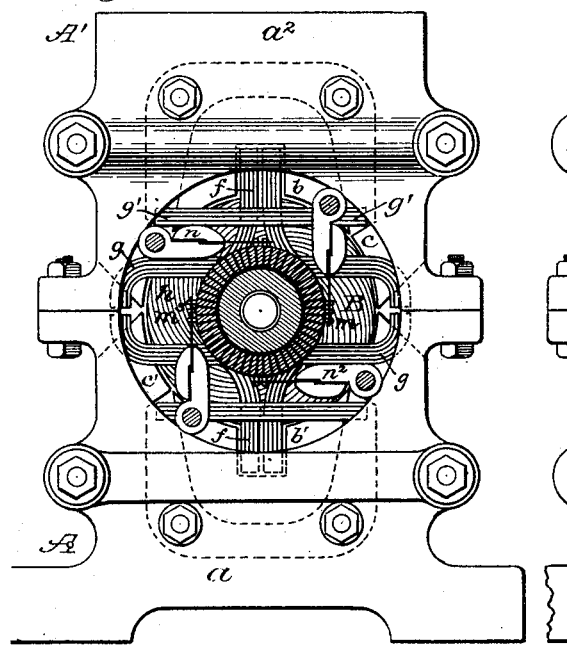
Figure 3:
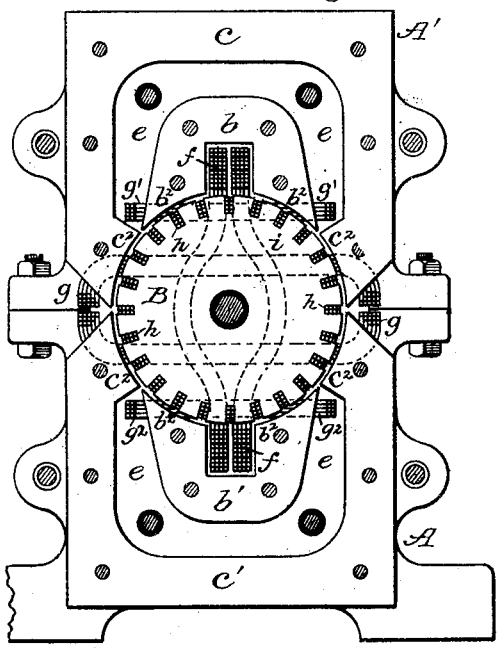
Figure 4:
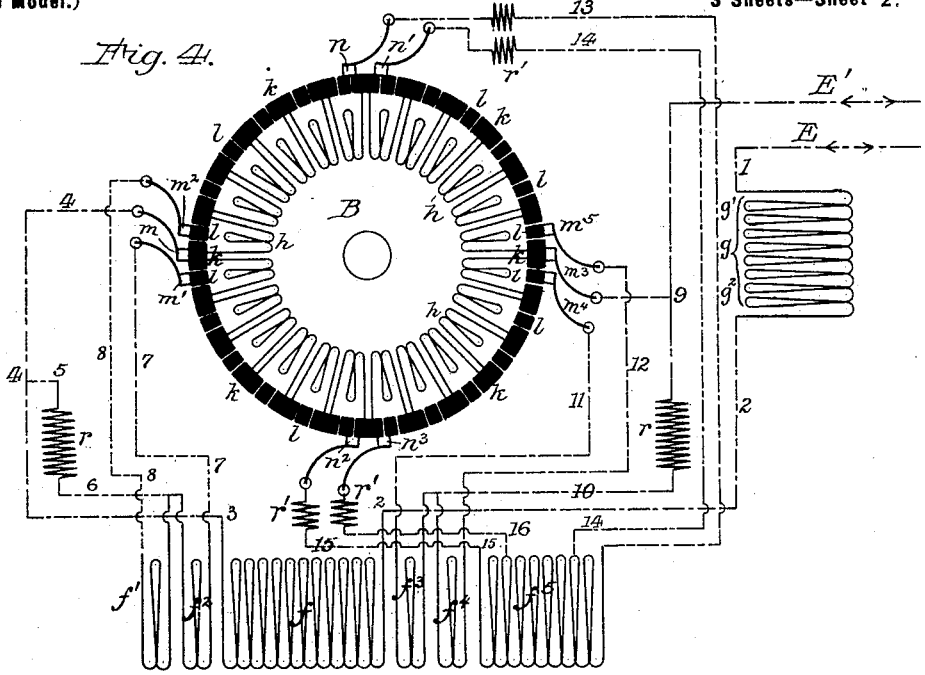
Figure 5:
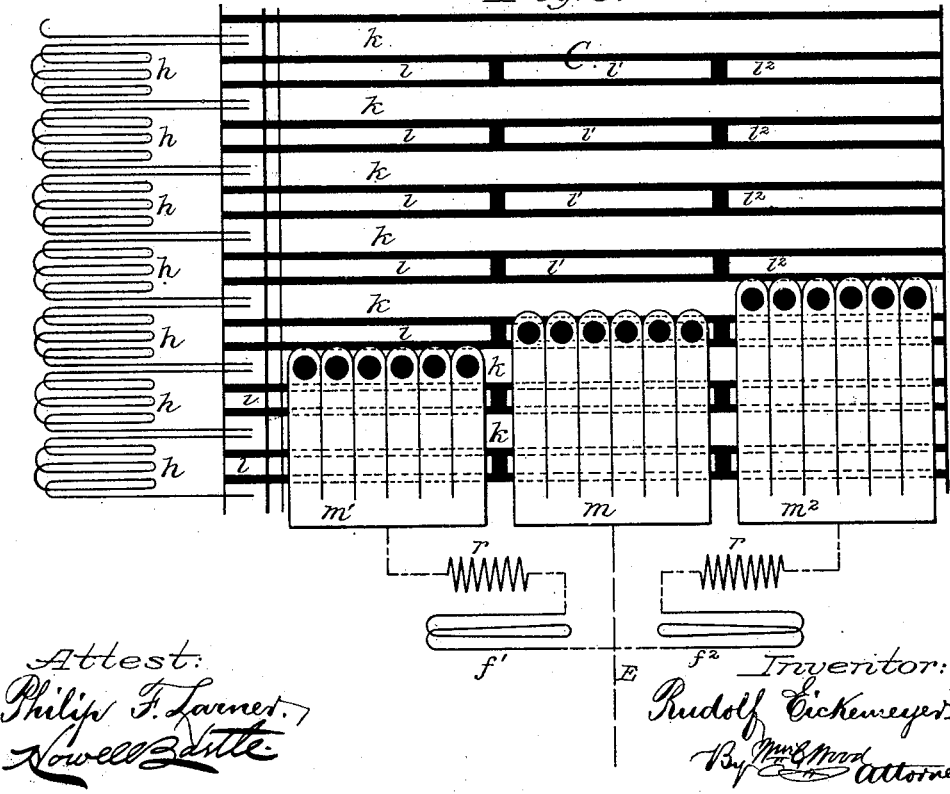
Figure 6:
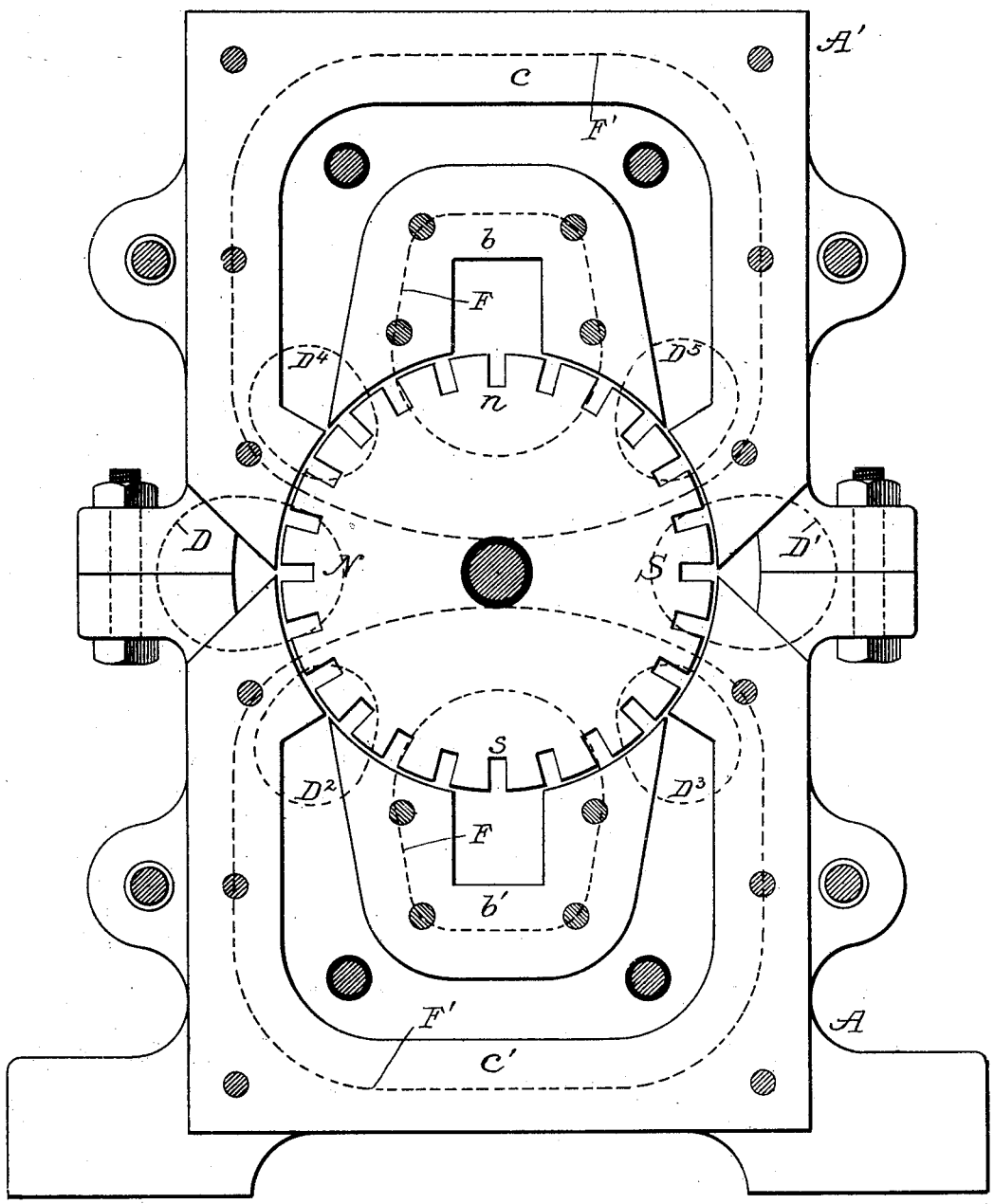

Figure 1, in longitudinal vertical section, illustrates an alternating-current machine which in operation involves my said novel method. Fig. 2 illustrates said machine in end view, but with the commutator-bars in section. Fig. 3 is a central vertical cross-section of the same. Fig. 4 is a diagrammatic illustration of the electric and magnetic system of the machine. Fig. 5 illustrates a portion of the commutator in plane projection, some of the armature-coils, one set of the commutator-brushes, one line-wire, and certain special coils which are in direct communication with the brushes. Fig. 6 illustrates the field metal of the machine and the armature without any of the coils shown in Fig. 3, but with various magnetic circuits indicated in dotted lines.

Although the working of my said novel method is in no manner restricted to machines having any special polar arrangement, it will be described in connection with a bipolar machine, although a multipolar machine was also disclosed in my aforesaid application for Letters Patent.

In the bipolar machine, Figs. 1, 2, and 3, the inclosing structure or frame includes the field-magnets, consisting of a base portion A and a top portion A'. These two sections are united on a horizontal line in a plane with the axis of the armature-shaft by means of short vertical bolts. The base-section consists in part of two end plates $a\ a'$, each affording a support for the journal-bearings. The top section consists in part of two end plates $a^2\ a^3$. The iron or field-magnet metal affords separate magnetic field-circuits and is in four separate masses or bodies $b\ b'$ and $c\ c'$, and these are mounted between four skeletonized non-magnetic plates or brass castings $d\ d'\ d^2\ d^3$, and all are clamped together by means of well-insulated bolts. The masses $b$ and $b'$ are laminated, being composed of insulated light thin plates of soft iron, each of horseshoe form and each mass affording concave cheeks or faces at $b^2$, and between said faces there is a central longitudinal rectangular recess, and one of said masses is above and the other below the circular space occupied by the armature B. The masses of iron $c\ c'$ are also laminated, and they are somewhat similar to the masses $b\ b'$ in form, and each is large enough to inclose the adjacent mass $b$ or $b'$ and to afford large intervening spaces, as at $e$. The iron plates of the masses $c\ c'$ at their inner ends afford concave cheeks or pole-faces $c^2$; but said ends are separated on a horizontal line by a space about equal to the distance between their concave faces and the armature; but outwardly said ends angularly diverge and form V-shaped spaces, as shown in Figs. 2, 3, and 6. The spaces $e$ being parallel with the paths of the field magnetism do not operate as air-space resistances in the field-magnet circuits; but said spaces $e$, as well as the V-shaped spaces between the upper and lower masses of iron $c$ and $c'$, constitute air-gaps which intersect the armature magnetic circuits and afford desired resistance therein, as will be hereinafter further explained.

The armature B is surrounded longitudinally in a vertical plane by a main field-coil $f$, which has straight sides housed in the central recesses of the masses of iron $b\ b'$, and said coil is made in two properly-coupled sections or halves which at their ends are so bent or curved as to afford the space occupied by the armature-shaft. This main field-coil contains a small number of convolutions, and its exciting capacity is weak as compared with that of the armature-winding. Closely surrounding the field-coil and conforming thereto are other coils, each separate from the main field-coil, although of course they may all be mechanically united and handled as if they were two halves of a large field-coil. These other coils cannot well be separately shown in Fig. 3; but it is to be understood that conforming in shape with the field-coil there are five independent but closely contiguous coils which will be specially described and designated as isolated coils $f'$, $f^2, f^3, f^4,$ and $f^5$, as shown in Fig. 4. The duty of four of these coils is to guard the armature-coils while they are passing under brushes and to eliminate as far as possible that portion of the electromotive force which by rapidly-varied field magnetism is induced in those armature-coils which for the time being are passing under the main commutator-brushes, as will be hereinafter explained. Each of the coils $f', f^2, f^3$, and $f^4$ contains a few turns of coarse wire, and the coil $f^5$, hereinafter described, contains a greater number of turns of fine wire. The armature B is also closely surrounded longitudinally in a horizontal plane by another field-coil $g$, which I term the "counter field," and this is also constructed in halves, and its ends are inside of the ends of the main field-coil and lie parallel with the ends of the armature, above and below its shaft, and its straight sides fill or occupy the V-shaped gaps or spaces between the upper and lower masses of iron $c\ c'$, and they are closely adjacent to and overlie the armature-winding. Two other horizontally-arranged counter field-coils $g'\ g^2$ surround the inner portions of the iron field masses $b$ and $b'$, the sides of said coils filling the gaps or spaces between the inner and outer portions of the field iron masses $b$ and $c$ and $b'$ and $c'$. The ends of said coils are parallel with the adjacent portions of the ends of the armature, but outside of the ends of the main field-coil $f$, and their sides closely overlie the armature-winding. These counter field-coils $g$ $g'$ $g^2$ are coupled together in series and coupled in series with the main field-coil and also with the armature-coils. Each portion of the counter field forms with such adjacent and parallel portions of the armature-coils as are overlaid by it (and in which the current is in opposite direction) a bifilar electric circuit, which is theoretically free from self-induction, at least the counter field practically neutralizes self-induction in the armature-circuit, and its action is supplemented by the action of the air-gap resistances, and, still further, by working a strong armature in a weak field, which materially reduces the self-induction of the field. The armature embodies windings $h$, substantially corresponding with the winding of continuous-current armatures of the Paccinotti type, and, like those, the core of said armature B is toothed or longitudinally scored on its periphery; but it is of drum form, and the core is composed of thin notched disks $i$ of soft iron well insulated.

As thus far described, it will be seen that the laminated iron in the field is in several comparatively small masses, and hence the undue formation of magnetic fluxes about the armature electric circuits is greatly obviated, which proportionately decreases the counter electromotive force of self-induction. The iron in the armature-core is laminated, as in ordinary machines, and hence is capable of responding rapidly to magnetic variations.

The commutator C is shown in section in Figs. 1 and 2 and partially in plane projection in Fig. 5. In this commutator there is a set of long comparatively wide bars $k$, to each of which the terminals of appropriate armature-coils $h$ are connected. Between these live bars $k$ there are narrow dead bars divided into three equal lengths, as at $l$ $l'$ $l^2$, and these are insulated from each other and from said wide live bars, and they have no electric connections. With this commutator (illustrated in Figs. 2, 4, and 5) four sets of brushes are employed, one set being triple and the other double. The triple sets $m$, $m'$, and $m^2$ and $m^3$, $m^4$, and $m^5$ are opposite each other on a horizontal line, and they maintain a circuit from the line-wires through the armature-coils. The two sets of double brushes $n$ $n'$ and $n^2$ $n^3$ are located in a line at right angles or perpendicular to the real commutator-brushes, and they are in this machine connected with a coil or coils $f^5$, which are not connected with the live circuit, as is clearly indicated in Fig. 4. The brushes of the $m$ series are alike, each brush being provided with several carbon contacts in line with each other in each brush; but the contacts in the three brushes of each set occupy different lines, so that when the two outer brushes bear upon two separate long bars $k$ the middle one will bear upon one of the narrow short bars $l'$, as shown in Fig. 5, and also so that when the two outside brushes bear upon short bars $l$ and $l'$ the middle brush will bear upon an intervening live bar $k$. The double brushes of the $n$ series separately considered are like either two of the other brushes, and each brush alternately bears upon a live bar $k$ and a dead bar $l$ or $l'$, as the case may be.

Referring now to Fig. 4, it will be understood that the armature B, its windings $h$, and the commutator-bars $k$ and $l$ are shown in diagram only. The field-coil $f$ is also shown in appropriate relation with the isolated coils $f'$, $f^2$, $f^3$, $f^4$, and $f^5$, while the counter fields are shown at $g$, $g'$, and $g^2$ massed in one coil. The line-wires are shown at E and E', and, commencing with the wire E, the electric connections will be followed by the use of numerals for designating the several wires or conductors. The line-wire E connects with a terminal 1 of the counter fields $g$ $g'$ $g^2$, thence by wire 2 with one terminal of the true or main field-coil $f$, thence from its other terminal by wires 3 and 4 connects with the middle brush $m$ of one set, and through it with a live bar $k$ and one terminal of each two armature-coils $h$ $h$. The wire 4 at wire 5 shunts to a resistance at $r$ and thence by wire 6, which branches to adjacent but opposite terminals of the extra or isolated coils $f'$ $f^2$, and the other terminals of these coils are separately connected by wires 7 and 8, respectively, with the brushes $m'$ and $m^2$, which, as here shown, are resting on dead bars $l$, and hence said coils are not in this position of the commutator in connection with the armature circuit. The other terminal line-wire E' is reached at wire 9 from the armature-circuit by way of the middle brush $m^3$, which, as here shown, is resting on a live commutator-bar $k$, and hence it connects with one terminal of each of two armature-coils $h$ $h$. As here shown, the brushes $m^4$ and $m^5$ rest on dead bars $l$. When said brushes are in contact with live bars, the armature-circuit and line-wire E' are connected, by way of the wire 10, isolated coils $f^3$ $f^4$, and wires 11 and 12, to brushes $m^4$ and $m^5$, respectively, a resistance $r$ between wires 9 and 10 being common to both brushes and to both of said isolated coils. With the brushes $m'$ and $m^2$ also resting on live bars the isolated coils $f'$ and $f^2$ will be then in circuit by way of wires 4, 5, 6, 7, and 8, and the circuit will also then include a resistance $r$ between wires 5 and 6. When the current traverses the isolated coils, it is in opposite directions, and hence in some of said coils the current flows opposite to the direction of the current in the field-coil, the isolated coils thus balancing each other and without affecting the exciting capacity of the field-current. The fifth coil $f^5$ is in communication with portions of the armature-coils by way of the four brushes of the $n$ series, which rest upon opposite sides of the commutator, so that always at least one of these brushes is in connection with a live bar on a line perpendicular to the horizontal commutator-line on which brushes of the $m$ series are located. One terminal of the coil $f^5$, by way of wire 13, connects with brush $n$ at the upper side of the commutator. The brush $n'$, by way of wire 14, also connects with coil $f^5$, but at certain positions of the commutator short-circuits some of its convolutions, as clearly indicated. The other terminal of the coil $f^5$, by way of wire 15, connects with a brush $n^2$, while the brush $n^3$, by way of wire 16, in like manner short-circuits upon a few convolutions at that end of the coil $f^5$. In the position here shown it will be seen that the two brushes $n$ $n'$ are bearing upon a live bar $k$, and the diametrically opposite live bar $k$ is also in like contact with the brushes $n^2$ $n^3$. Each of the wires 13, 14, 15, and 16 is provided with a resistance $r'$. With a slight rotative movement of the armature the brush $n$ (for instance) will still rest on a live bar $k$, and brush $n'$ will rest on a dead bar, and so also will brush $n^3$ rest on a live bar and brush $n^2$ on a dead bar, and a still further movement will place all four of the brushes on live bars, and so on. The brushes of the $n$ series are located at those points of the commutator between which the counter electromotive force of self-induction which is induced by the pulsations of the alternating current in the field is at its maximum, and this portion of the said electromotive force is balanced or neutralized by an equal electromotive force of opposite direction induced by the varying field magnetism of the isolated coil $f^5$, Fig. 4, which, as before stated, is in close proximity to the main field-coil $f$. Should the field magnetism exceed the armature magnetism, the electromotive force in the coil $f^5$ overpowers the electromotive force between the brushes $n$ $n'$ and $n^2$ $n^3$ and sends through the armature a current which tends to produce a shifting of phase in the armature magnetism. These four brushes of the $n$ series and their isolated coils constitute a circuit which has no direct connection with the main line, but which affords (or contributes to) an effective regulation of the counter electromotive force of self-induction in the armature.

In the conversion of the energy of alternating electric currents into mechanical motion my method of obviating the short-circuiting of the armature-coils as they come under the brushes is completely effective in preventing the burning out of the armature-winding, and this portion of my invention will be now described.

In position as shown in Fig. 4 the two line-terminals, by way of the opposite $m$ series brushes and live bars $k$ $k$, are in full connection with the armature-circuit. The armature and commutator on being slightly rotated in either direction will enable two brushes of each $m$ set to bear on one live bar $k$, and each of these brushes will then carry its proportion of the current. The isolated coils $f'$ $f^2$ $f^3$ $f^4$ will meantime be short-circuited through the resistances $r$ $r$ in the conductors 5 6 and 9 10.

These resistances should be of such capacity as to decrease or restrict to a moderate value the current caused by the counter electromotive force induced in the coils $f', f^2, f^3$, and $f^4$. The suggested movement of the armature and commutator will also cause one brush of the $n$ series to bear upon the next live bar, and hence all four of the brushes will then connect with four live bars and with the armature-coils connected with said bars. The said armature-coils will also be in circuit with the isolated coils $f'$ $f^2$ $f^3$ $f^4$, and the electromotive force induced therein by the rapidly-varying field magnetism will counterbalance a part of the electromotive force induced in these armature-coils by the field magnetism, while the resistances $r$ $r$ will decrease to a moderate degree the current set up by that part of the electromotive force which is induced in the armature-coils which is not counterbalanced by the isolated coils. With the armature still further rotated the middle brushes $m$ and $m^3$ will rest on middle dead bars $l'$, and the outer brushes of each set will rest on separate live bars $k$, and both will carry current as before; but the armature-coils connected with said bars will be in circuit with the isolated coils or with the latter and resistance, as illustrated in Fig. 5, and thus a portion of the counter electromotive force induced in said armature-coils will be balanced. It will now be seen that no armature-coil is ever short-circuited; but each as it passes the brushes is always in circuit with at least one resistance $r$ and with at least one isolated coil of the $f'$ $f^2$ $f^3$ $f^4$ series.

That portion of my invention which consists in balancing the electromotive forces of the commutated armature-circuits by opposing said forces with or by appropriately strong and opposite electromotive forces is mainly accomplished by the described arrangement of the brushes of the $m$ series and the isolated coils $f'$ $f^2$ $f^3$ $f^4$ and fully accomplished when supplemented by the resistances between said coils and the brushes. The resistances, however, are very effective in obviating the short-circuiting of the armature-coils by reducing the currents produced by the electromotive forces generated therein to safe limits.

Having described the several electric connections separately, I will now briefly describe the path of the alternating current through the machine, as shown in Fig. 4.

The current entering at E passes through the counter-field $g$ $g'$ $g^2$ into the main field-coil $f$ and therefrom over wire 3, which has two branches 4 and 5. On branch 4 it goes by direct path to the middle brush $m$ to the armature-circuit. Should the brushes $m'$ and $m^2$ be resting on live bars, the path would then be by way of branch 5, through resistance $r$, to wire 6, which divides, so that one path would be by way of coil $f'$ to wire 8 and brush $m^2$ and another path in an opposite direction by way of coil $f^2$ to wire 7 and brush $m'$ to the two live bars $k$. From the brushes $m$ $m'$ $m^2$ the current passes in two paths upward and downward through the armature-coils to the opposite brushes $m^3$, $m^4$, and $m^5$. From the armature-circuit the current has exit by way of the brushes $m^3$ $m^4$ $m^5$, in part directly by way of brush $m^3$ and wire 9, to line-wire E'; but when the brushes $m^4$ and $m^5$, or either of them, rests upon a live bar $k$ the exit from brush $m^4$ is over wire 11, through isolated coil $f^3$, to wire 10, and through resistance $r$ to wire 9, and thence to line-wire E', and from brush $m^5$, over wire 12, to and through the isolated coil $f^4$ to wire 10, through resistance $r$ to wire 9, and thence to line-wire E'.

Referring now to Figs. 3 and 6, it will be seen, as before stated, that the field magnetic system is divided into two main portions, one being wholly above and the other below the axial line of the armature. Each of these two portions is divided into two parts, the magnetic circuits of each crossing portions of the armature-core, the one traversing a part of the core and the magnetic metal $b$ or $b'$, as at F and F, Fig. 6, and the other, as at F' F', traversing the core and the magnetic metal $c$ or $c'$, thus inducing poles N and S on a horizontal line. There being no breaks or air-space resistance in either of these four divisions of the field magnetic circuit except those which essentially occur between the magnetic cheeks and the armature, it will be obvious that the machine has field magnetic circuits of very low resistance. The particular portion of the armature magnetic circuit which must be specially controlled for eliminating self-induction is also divided into two parts, one of which is located at the right and the other at the left hand side of the armature, as shown in Fig. 6 by dotted lines indicating magnetic circuits at D and D', the armature-winding as a whole inducing in the armature-core $n$ and $s$ polarity above and below its horizontal axial line.

Minor portions of the armature magnetic circuit which are profitably controlled for the elimination of self-induction are located at the four points between the coincident portions of iron $b$ and $c$ and $b'$ and $c'$, there being at those points four magnetic circuits, (indicated in dotted lines and designated $D^2$, $D^3$, $D^4$, and $D^5$,) as shown in Fig. 6. It will now be observed, as shown in Fig. 3, that the main portion of the counter-field, as at $g$, is located within the principal magnetic circuits D and D' of Fig. 6 and that the minor portions of the counter-field, as at $g'$ $g^2$, are located within the magnetic circuits $D^2$, $D^3$, $D^4$, and $D^5$. The fluxes due to the armature magnetomotive forces which might exist in these several magnetic circuits are balanced, neutralized, or eliminated by the counter-field, because the latter affords magnetomotive forces which are always opposite in direction to the direction of said magnetomotive forces, or, otherwise stated, the magnetism which would have been induced by adjacent armature-coils in said circuits at D D', &c., is not induced at all, because the current in the counter-field and the opposite current in the adjacent armature-winding forms bifilar or inductionless circuits, which are incapable of developing magnetism. It will also be observed that the anti-inductive action of the counter-field is augmented by the air-space resistances afforded mainly at the V-shaped spaces at the two sides of the armature in the magnetic circuits D D', and, further, at the four spaces occupied by the portions $g'$ and $g^2$ of the counter-field in the magnetic circuits $D^2$, $D^3$, $D^4$, and $D^5$, thus causing each of said circuits to be of relatively high magnetic resistance. If such air-space resistance should alone be relied upon for reducing self-induction of the armature, valuable results would accrue; but when accompanied by the bifilar circuits the armature self-induction is practically eliminated. The counter electromotive force of self-induction which would have been developed by the field is materially reduced by working a strong armature in a weak field, it being obvious that the few convolutions of wire in the main field-coil $h$ has a weak magnetic exciting capacity, as hereinbefore set forth.

Now, referring to the bifilar circuits, on which main reliance is had for eliminating counter electromotive force of armature self-induction, it is obvious that the required bifilar circuits are not mere conductors, nor are they necessarily due to the presence of specially-formed coils, so long as paths are afforded closely adjacent to the armature-winding for a neutralizing-current flowing in an opposite direction to that of the current in the adjacent armature-coils and so proportioned thereto as to form the bifilar or inductionless circuits—as, for instance, in my aforesaid application I disclosed coils each of which serves at one point as a field-coil and at another point as a counter-field coöperating with adjacent coils of the armature in forming a bifilar circuit.

It will be seen that the short-circuiting of the armature-coils is an impossibility, thus securing in my machines those good results which would be incident to neutral lines.

So far as my knowledge extends I am the first to devise and construct alternating-current motors capable of starting promptly under load and with which in the event of a non-rotation of the armature under full current no liability exists of burning out the armature-coils, this being rendered impossible because said coils cannot be short-circuited. This capacity for promptly starting under ordinary load is due to the practical elimination of counter electromotive force of self-induction, and said elimination is mainly due to the employment of the method which constitutes the main feature of my invention and consists in practically eliminating armature self-induction by establishing bifilar or inductionless circuits at appropriate portions of the armature-circuit. The practice of this last-recited method in itself assures a practical, effective, economical, and commercially valuable conversion of the energy or electromotive force of alternating currents into mechanical energy. If the aforesaid method be supplemented or enlarged by the introduction or employment of air-space resistance in appropriate armature magnetic circuits, much greater mechanical energy will be assured, the supplied alternating current remaining the same, because the said introduction of air-space resistance constitutes in itself an effective method of reducing self-induction in alternating-current machines. So, also, will the resultant mechanical energy be increased with the same supplied current if the before-recited method or methods be again supplemented by working strong armature-circuits within comparatively weak field-circuits, because the said working constitutes an effective method of reducing self-induction in alternating-current machines. These three specified modes considered separately or as a complex method of working alternating currents pertain to the elimination of self-induction from alternating-current motors. It is therefore to be understood that the best results will accrue from the working of alternating electric currents in accordance with that complex method which includes not only the prime method (which constitutes the main feature of my invention) but also all of the minor or supplemental methods of reducing self-induction. If, however, the said minor methods should be worked alone or together as a complex method or methods, greater mechanical energy can be derived from alternating currents of a given potential than from alternating-current machines operating under any prior method or methods known to me, although none of the results attained from working said minor or supplemental methods would compare favorably with those assured from the working of my prime method alone and especially when supplemented by either or all of the recited minor methods.

Although I have described my invention in connection with operating bipolar machines, it is to be understood that my method or methods can as well be applied to operating multipolar machines, and whether they be reversible or non-reversible, all of which was disclosed in my aforesaid application for Letters Patent.

Having thus described my invention, I claim as new and desire to secure by Letters Patent—

1. The method substantially as hereinbefore described, of converting the energy of alternating electric currents into effective mechanical energy, which consists in eliminating counter electromotive force of self-induction from alternating-current machines, by establishing bifilar or inductionless circuits at appropriate portions of armature-circuits whereat self-induction would otherwise have been developed.

2. The method substantially as hereinbefore described, of reducing counter electromotive force of self-induction, in alternating-current machines, by employing air-space resistance in those armature magnetic circuits at which self-induction would otherwise have been developed.

3. The method, substantially as hereinbefore described, of converting the energy of alternating electric currents into effective mechanical energy, which consists in eliminating counter electromotive force of self-induction from alternating-current machines, by establishing bifilar or inductionless circuits at appropriate portions of armature-circuits, supplemented by air-space resistance adjacent to said bifilar circuits, in those armature magnetic circuits at which self-induction would otherwise have been developed.

4. The method of reducing counter electromotive force of self-induction in an alternating-current dynamo-electric machine, having commutated armature-circuits, which consists in reducing the self-induction of the field-windings with respect to that of the armature-windings.

5. The method, substantially as hereinbefore described, of converting the energy of alternating electric currents into effective mechanical energy, which consists in eliminating counter electromotive force of self-induction from alternating-current machines, by establishing bifilar or inductionless circuits at appropriate portions of the armature-circuits, and by reducing the self-induction of the field-windings with respect to that of the armature-windings.

6. The method, substantially as hereinbefore described, of converting the energy of alternating electric currents into effective mechanical energy, which consists in eliminating counter electromotive force of self-induction from alternating-current machines, by reducing the self-induction of the field-windings with respect to that of the armature-windings, establishing bifilar or inductionless circuits at appropriate portions of the armature-circuits, and opposing a high magnetic resistance to the fluxes in the local magnetic circuits surrounding the armature-conductors.

7. The method of obviating the short-circuiting of the armature-coils of an alternating-current dynamo-electric machine, which consists in generating by induction from said alternating current an opposing electromotive force and balancing the electromotive force of the commutated armature-circuits by said opposing electromotive force.

8. The method of obviating the short-circuiting of the armature-coils of an alternating-current dynamo-electric machine, which consists in generating by induction from said alternating current an electromotive force and opposing the electromotive force of the commutated armature-circuits by said induced electromotive force in a circuit containing resistance.

9. The method of reducing the self-induction of an alternating-current dynamo-electric machine, which consists in causing alternating currents to flow in windings in close proximity to the armature-conductors in such a manner as to oppose the effects of the currents flowing in said conductors.

10. The method of reducing the self-induction of an alternating-current dynamo-electric machine, which consists in passing the alternating current through windings external to the armature, but in close proximity thereto, in such a manner as to oppose the creation of a flux in local magnetic circuits surrounding the armature-conductors.

11. The method of reducing the counter electromotive force of self-induction in dynamo-electric machines, which consists in opposing a high magnetic resistance to the fluxes in the local magnetic circuits surrounding the armature-conductors.

RUDOLF EICKEMEYER.

Witnesses:
    R. EICKEMEYER, Jr.,
    JOHN L. CLARK.